(12) United States Patent
Baron et al.

(10) Patent No.: US 7,633,261 B2
(45) Date of Patent: Dec. 15, 2009

(54) PRIMARY BATTERY WITH INTERNAL VOLTAGE REGULATOR

(75) Inventors: Mark A. Baron, New Port Richey, FL (US); Frank E. Feldmann, Palm Harbor, FL (US); William H. Metka, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 392 days.

(21) Appl. No.: 11/691,628

(22) Filed: Mar. 27, 2007

(65) Prior Publication Data

US 2008/0238368 A1 Oct. 2, 2008

(51) Int. Cl.
*H01M 10/46* (2006.01)
*H01M 10/44* (2006.01)

(52) U.S. Cl. .................................................. 320/107
(58) Field of Classification Search ............. 320/107, 320/112, 128; 429/90, 91, 96, 99, 100
See application file for complete search history.

(56) References Cited

U.S. PATENT DOCUMENTS

| | | | |
|---|---|---|---|
| 4,296,461 A | 10/1981 | Mallory et al. | |
| 4,563,627 A | 1/1986 | Orban | |
| 5,445,900 A | 8/1995 | Miller, Jr. et al. | |
| 5,545,935 A | 8/1996 | Stewart | |
| 5,731,686 A | 3/1998 | Malhi | |
| 5,804,894 A | 9/1998 | Leeson et al. | |
| 6,118,248 A | 9/2000 | Garstein et al. | |
| 6,118,678 A * | 9/2000 | Limpaecher et al. | 363/60 |
| 6,147,472 A | 11/2000 | Hewes et al. | |
| 6,198,250 B1 | 3/2001 | Gartstein et al. | |
| 6,198,252 B1 | 3/2001 | Mukainakano | |
| 6,232,749 B1 | 5/2001 | Hewes et al. | |
| 6,304,063 B2 | 10/2001 | Maloizel et al. | |
| 6,654,228 B1 * | 11/2003 | Bailey | 429/90 |
| 6,731,022 B2 | 5/2004 | Silverman | |
| 6,979,502 B1 | 12/2005 | Garstein et al. | |
| 7,084,608 B2 | 8/2006 | Lopata | |
| 7,163,757 B2 | 1/2007 | Iwasaki et al. | |

(Continued)

FOREIGN PATENT DOCUMENTS

DE 10-2005-019-116 A1 10/2006

OTHER PUBLICATIONS

European Search report dated Sep. 15, 2008.

*Primary Examiner*—Edward Tso
(74) *Attorney, Agent, or Firm*—Oral Caglar, Esq.

(57) ABSTRACT

A battery cell assembly includes a standard size primary high energy density battery cell assembly and a voltage regulator integrated within the battery cell assembly. A method for providing a standard size primary high energy density battery cell assembly includes integrating a voltage regulator circuit into a standard size primary high energy density battery assembly and regulating an output voltage of the high energy density battery cell assembly to match an output voltage of a standard primary battery. Embodiments of the present invention may integrate a voltage regulator into a commercially available primary high energy density battery cell. The voltage regulator as in one embodiment of the present invention may be used to downscale the output voltage of the high energy density battery cell. The high density battery assembly as in embodiments of the present invention may be used in existing equipment currently powered by standard primary batteries.

18 Claims, 3 Drawing Sheets

U.S. PATENT DOCUMENTS

2002/0001745 A1 1/2002 Gartstein et al.
2004/0126627 A1 7/2004 Heine et al.
2005/0042504 A1 2/2005 Chen

* cited by examiner

PRIMARY BATTERY WITH INTERNAL VOLTAGE REGULATOR

BACKGROUND OF THE INVENTION

The present invention generally relates to standard primary batteries and, more particularly, to a primary battery cell with an integrated voltage regulator and a method for providing a standard size primary battery cell having a high energy density.

Commercially widely available standard primary (non-rechargeable) batteries include, for example, standard size alkaline or carbon-zinc batteries, such as D, C, AA, or AAA single-cell batteries, which have typically a standard output voltage of 1.5 V (volt) or lead-acid batteries that typically have a standard output voltage of 2.0 V. Most currently existing equipment used by consumers, often on a regular basis, utilizes these inexpensive standard primary batteries in single or multiple to get the correct voltage for the equipment. Standard primary batteries are often used by consumers in portable electronic devices, such as electronic calculators, electronic door locks, fire detectors, flashlights, radios, electronic toys, tape recorders, compact disc players, cameras, cellular phones, pagers, small kitchen appliances, and other cordless consumer products. As electronic devices become faster and more complex, the devices may require more power for operation and, therefore, typical standard primary batteries may need to be replaced more often. When a standard primary battery is not providing the needed current anymore it is typically thrown away. Therefore, a growing demand exits for longer lasting standard primary batteries. In addition, in areas where it is difficult to replace or service, consumers would often like to use higher cost but longer lasting technologies, for example, lithium-ion technology instead of the inexpensive standard primary batteries.

Consequently, it would be advantageous for the consumers to exchange standard primary batteries with higher energy density batteries, such as lithium-ion battery cells. Unfortunately this is currently not possible since the output voltage of such higher energy density battery cells is, for example with about 3.0 to 3.9 V, typically higher than the output voltage of about 1.5 V of a standard primary battery. Also future development of higher energy density battery cells could lead to even higher output voltages. To take advantage of modern technologies, such as the lithium-ion technology, equipment could be redesigned to use higher energy density battery cells, but this may not always be convenient, cost effective or even possible with existing equipment.

Various prior art, self-contained, portable energy storage devices exist that address these current market demands. For example, U.S. Pat. No. 6,654,228 utilizes a step-down voltage converter in a primary alkaline battery. The provision of a step-down voltage converter in a primary alkaline battery results in a substantially constant discharge voltage throughout the useful life of the battery and, therefore, the effective lifetime or the alkaline battery may be extended.

In another example, U.S. Pat. No. 6,232,749 describes a battery pack that includes a DC-DC (direct current) converter operatively coupled to a group of at least two primary cells. The DC-DC converter converts the voltage to a regulated nominal voltage that is lower than the rated voltage of the group of primary cells. By regulating the battery voltage down to a constant voltage, the cells can discharge down to a minimum voltage level per cell enabling additional energy transfer from the group of cells. While prolonging the lifetime of the battery pack, the described battery pack could not replace standard size primary batteries due to the form factor, the physical size and shape of the space receiving the standard size primary battery, in existing equipment.

As can be seen, there is a need for a standard size primary battery that has a longer effective lifespan than currently commercially available standard size primary batteries. Furthermore, there is a need to utilize high energy density technologies, such as the lithium-ion technology, for standard applications that meet the form factor of existing devices.

SUMMARY OF THE INVENTION

In one aspect of the present invention, a battery cell assembly comprises a standard size primary high energy density battery cell assembly; and a voltage regulator integrated within the battery cell assembly.

In another aspect of the present invention, a battery cell assembly comprises a primary lithium cell; a voltage regulator circuit in electrical connection with the lithium cell; and a case having the size and shape of a standard primary battery, wherein the case accommodates the lithium cell and the voltage regulator circuit; wherein the voltage regulator circuit regulates an output voltage of the lithium cell to an output voltage of the standard primary battery.

In a further aspect of the present invention, a method for providing a standard size primary high energy density battery cell assembly comprises the steps of: integrating a voltage regulator circuit into the high energy density battery assembly; and regulating an output voltage of the high energy density battery cell assembly to match an output voltage of a standard primary battery.

These and other features, aspects and advantages of the present invention will become better understood with reference to the following drawings, description and claims.

DETAILED DESCRIPTION OF THE INVENTION

Figure 1:
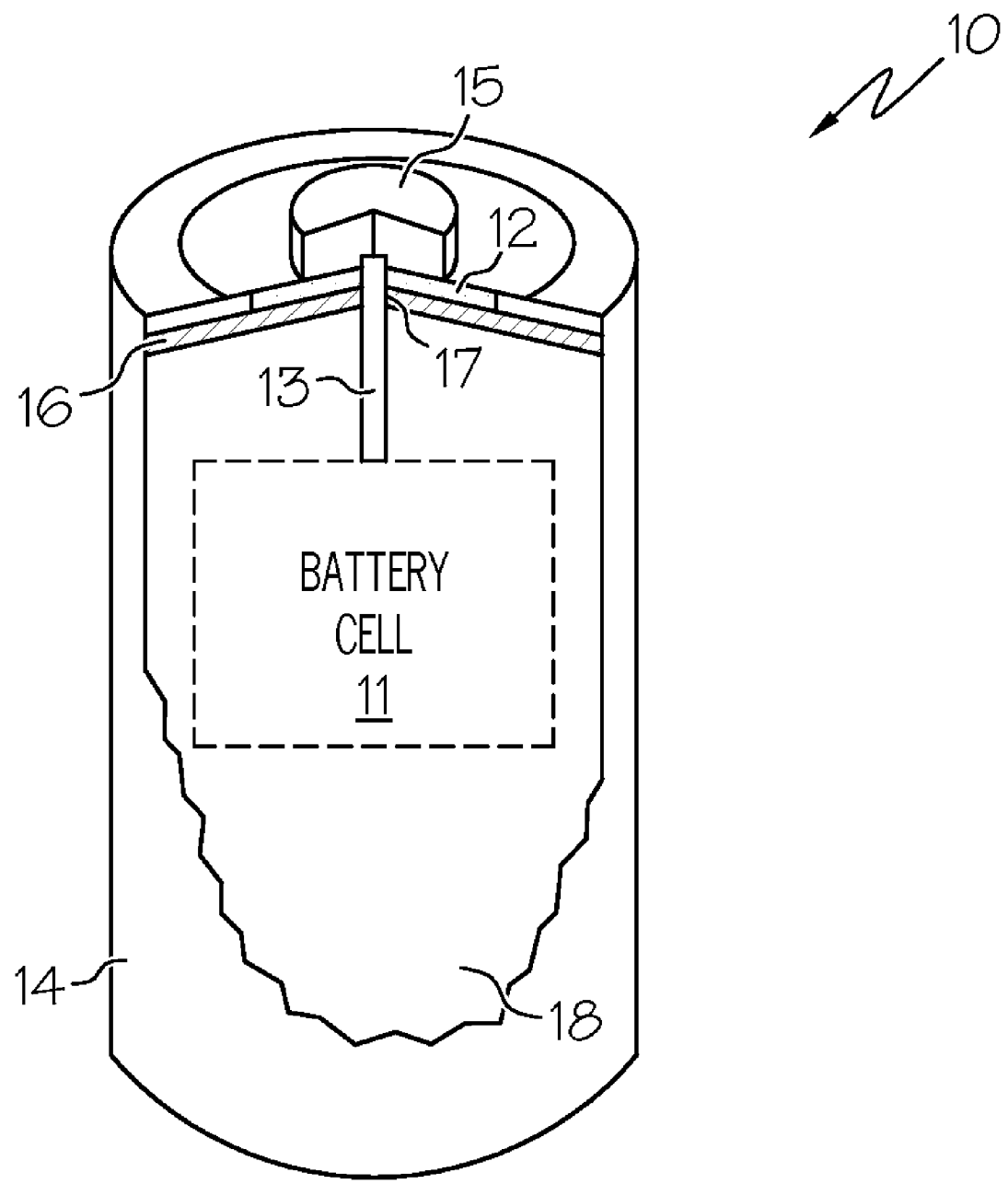
FIG. 1 is a perspective cutout view of a battery cell according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a high energy density primary (non-rechargeable) battery cell with an integrated voltage regulator. In one embodiment, the present invention provides a voltage regulator that may be installed in commercially available high energy density primary cells, such as C, CC, D, or DD size lithium-ion cells without redesigning these primary cells. Embodiments of the present invention may be suitable for, but not limited to, providing high energy density primary battery cells that fit in the form factor of existing devices that are typically operated by standard alkaline batteries. Embodiments of the present invention may be suitable for, but not limited to, difficult service applications, such as underwater locations, mines, towers, and hazardous locations. Compared to commercial standard primary batteries, such as alkaline batteries, embodiments of the present invention may provide a longer operational lifespan and lower pack weight, while eliminating equipment redesign.

Commercial off-the-shelf primary (non-rechargeable) lithium cells, for example, manufactured by Electrochem, Division of Wilson Greatbatch, Ltd. (NY, U.S.A.) are currently available in a wide variety of standard sizes, such as D, DD, C, CC, and AA, are reliable, durable, long-lasting, safe, have a high energy density, and can be used under extreme conditions, but have an output voltage of about 3 to about 3.9 volts per cell, which may be detrimental to existing equipment that is currently operated with standard alkaline batteries. Therefore, one embodiment of the present invention may integrate a voltage regulator into a commercially available lithium cell or other high energy density battery cell without redesigning the commercially available cell. The voltage regulator as in one embodiment of the present invention may be used to downscale the output voltage of the commercially available lithium cell to a desired voltage, for example, about 1.5 V, such that a lithium cell may be provided in order to replace or to be used instead of a standard alkaline cell.

Commercial off-the-shelf primary (non-rechargeable) lithium cells, for example, manufactured by Electrochem, Division of Wilson Greatbatch, Ltd. (NY, U.S.A.) typically already have a printed wiring board integrated into the lithium cell package. Therefore, space may already exist in commercially available primary lithium cells to receive a printed wiring board including the voltage regulator as in one embodiment of the present invention. Typically, such a prior art printed wiring board may include a safety fuse and diodes. Embodiments of the present invention may utilize the already existing printed wiring board. By integrating a voltage regulator into the lithium cell package, the safety fuse typically may no longer be needed since a voltage regulator is inherently current limiting and the diodes may no longer be needed since the voltage regulator is unidirectional. Therefore, space may exist on the already existing printed wiring board for receiving the voltage regulator as in one embodiment of the present invention.

Embodiments of the present invention may differ from prior art commercial off-the-shelf primary lithium cells by factory adjusting the output voltage of the primary lithium cell to accommodate the needs of existing equipment currently operated with commercial off-the-shelf alkaline batteries or other commercially available standard size batteries. Therefore, embodiments of the present invention may enable utilization of the advantages of lithium cells for everyday applications, such as portable electronic devices. For example, lithium cells produce about three times more energy density than alkaline cells, giving at least three times longer life in a consumer device. In terms of replacement, this means savings in transportation, man-hours, and materials. Consequently, while alkaline cells may have a lower unit cost, lithium cells may have a lower total cost. Furthermore, embodiments of the present invention may provide a consistently constant voltage output throughout the lifespan of the primary cell, while primary alkaline batteries have a voltage output that gradually decreases throughout the lifespan of the battery.

By adjusting the output voltage of commercial off-the-shelf primary lithium cells to about 2.0 V, embodiments of the present invention may further enable replacing highly toxic lead-acid batteries with lithium cells that contain material that are only hazardous when the cell is active, but after proper handling during disposal, the neutralized materials are environmentally benign.

Referring now to FIG. 1, a perspective cutout view of a primary battery cell assembly 10 is illustrated according to an embodiment of the present invention. The battery cell assembly 10 may include a primary (non-rechargeable) battery cell 11, a printed wiring board 12, a current collector tab 13, a case 14, and a terminal cap 15. The current collector tab 13 may electrically connect the battery cell 11 with the terminal cap 15 via the printed wiring board 12. The case 14 may accommodate the battery cell 11 and the printed wiring board 12. The case 14 may be a cylinder that may be open at one side. The terminal cap 15 may be used to close the open side of the case 14. The case 14 may be a stainless steel case. A lid 16 may be positioned inside the case 14. The lid 16 may separate the battery cell 11 from the printed wiring board 12. The lid 16 may be welded to the inside of the case 14. A hermetic seal 17 may hermetically seal the area where the current collector tab 13 extends through the lid 16. Consequently the case 14 may include a hermetically sealed space 18 for receiving the battery cell 11. The hermetic seal formed by the lid 16 and the seal 17 may be, for example, rated to about 800 psi (pounds per square inch). The case 14 of the battery cell assembly 10 may have a standard size and shape of a commercially available standard primary battery, for example, D, C, AA, or AAA. The case 14 of the battery cell assembly 10 may further have the size and shape of two commercially available standard primary batteries, for example, DD or CC. The battery cell assembly 10 may be a commercially available off-the-shelf part where only the printed wiring board 12 may have been modified as will be described in detail below, for example, a 3B36 lithium sulfuryl chloride DD cell manufactured by Electrochem, Division of Wilson Greatbatch, Ltd. Each 3B36 lithium sulfuryl chloride cell has an output voltage of about 3.9 V, which is too high to substitute, for example, standard alkaline cells. Other commercially available off-the shelf battery cell assemblies may be used as basis for the battery assembly 10 of the present invention.

The battery cell 11 may be a primary lithium cell or any other primary high energy density battery cell. The battery cell 11 may have, for example, a bobbin cell construction, a dual anode cell construction or a spiral wound cell construction. The battery cell 11 may be, for example, a spiral wound lithium sulfuryl chloride cell. Spiral wound cells may offer higher energy density and more consistent performance than other cell constructions. Also, the restart performance for pulsed or intermittent applications may be improved.

Figure 2:
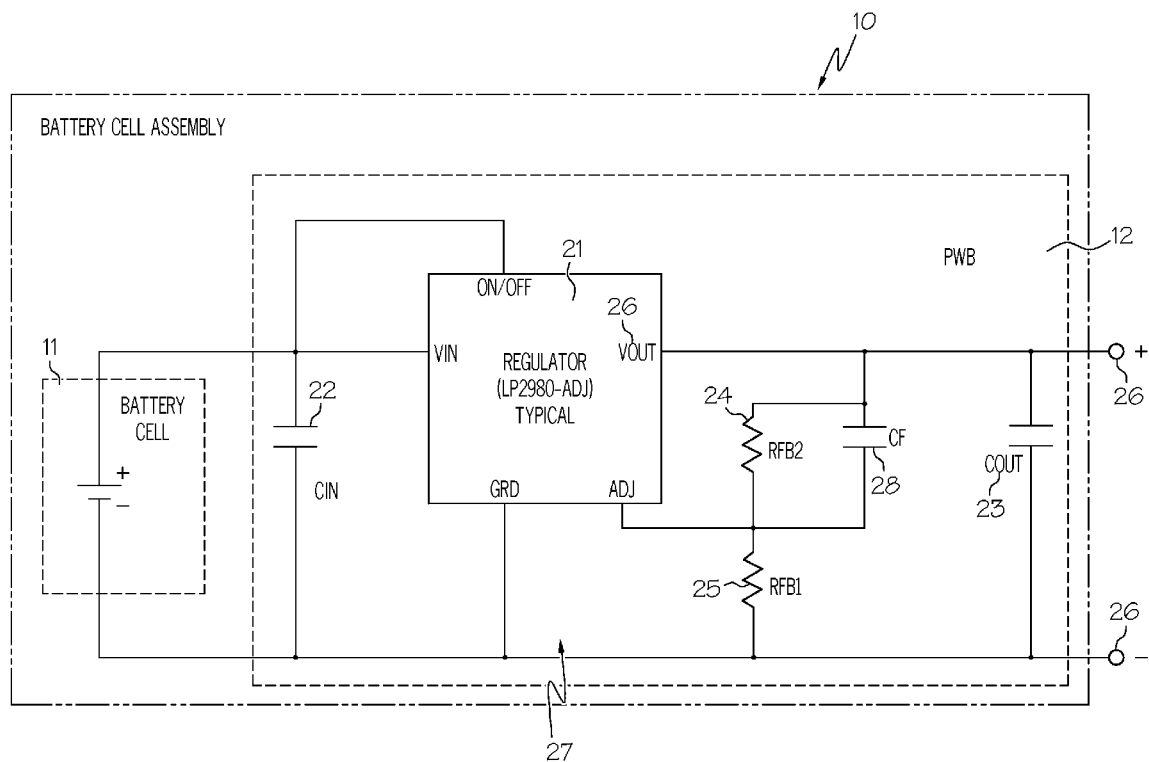
FIG. 2 is a block diagram of a battery cell assembly according to an embodiment of the present invention.

Referring now to FIG. 2, a block diagram of the battery cell assembly 10 is illustrated according to an embodiment of the present invention. As can be seen, a voltage regulator circuit 27 may be mounted on the printed wiring board 12 and may include a voltage regulator 21, an input capacitor 22, an output capacitor 23, a feed-forward capacitor 28, a resistor 24, and a resistor 25. The printed wiring board 12 may be a printed wiring board already existent in a commercially available off-the shelf battery cell assembly, such as, a 3B36 lithium sulfuryl chloride DD cell manufactured by Electrochem, Division of Wilson Greatbatch, Ltd. Since the voltage regulator 21 is inherently current limiting and unidirectional, a fuse and diodes typically mounted on the printed wiring board of a commercially available off-the shelf battery cell assembly and typically used to limit the value and direction of a current may no longer be needed. Consequently, space for mounting the voltage regulator 21, the capacitors 22, 23, and 28, and the resistors 24 and 25 on the printed wiring board 21 may be already available. Even though, a printed wiring board typically included in commercially available off-the-shelf battery cell assemblies may not be a full circle, it may be possible to utilize a circular printed wiring board as printed wiring board 12 as in one embodiment of the present invention. A circular printed wiring board 12 may provide more space for circuitry than a typical prior art printed wiring board if needed. It may further be possible replace the prior art printed wiring board with the printed wiring board 12 or use the printed wiring board 12 in addition to an already existing printed wiring board. It may also be possible to mount the voltage regulator circuit 27 on an already existing printed wiring board in addition to already existing circuitry.

The voltage regulator 21 may have a low dropout voltage (i.e. input-output differential voltage) and low quiescent current (the current through regulator 21 with no load present). By having a low dropout voltage, the life of the battery cell 11 may be extended and may enable the voltage regulator 21 to continue to provide the proper output voltage until the battery cell 11 dies. The dropout voltage may be, for example, about 0.1 V, but regulators with other similar low dropout voltages may be used. A low quiescent current is also beneficial in extending the life of the battery cell 11. A quiescent current below 100 μA may be beneficial for some embodiments of the present invention. By not consuming too much current, the voltage regulator 121 may enable more Ampere-hours to be used for powering a device.

An exemplary voltage regulator 21 that may be suitable for use in the battery cell assembly 10 may be regulator LP2980-ADJ produced by National Semiconductor, Inc. (CA, U.S.A.). The regulator LP2980-ADJ is an off-the-shelf commercially available regulator, which has a dropout voltage of about 0.1 V and about 60-62 μA quiescent current when used in embodiments of the present invention. However, it is to be understood that other off-the-shelf or custom made regulators may be used as regulator 21 in the battery cell assembly 10 of the present invention. By modifying an off-the shelf battery cell assembly 10 and using an off-the-shelf regulator 21, embodiments of the present invention may reduce costs typically associated with using custom made components.

Since the output voltage of lithium cells or other high energy density cells currently commercially available is too high to be used in applications where typically standard primary (non-rechargeable) batteries, for example, standard size alkaline or carbon-zinc batteries, such as D, C, AA, or AAA single-cell batteries, which have typically a standard output voltage of 1.5 V (volt) or lead-acid batteries that typically have a 2.0 V standard output, the voltage regulator circuit 27 mounted on the printed wiring board 12 may regulate the output voltage 26 to the value of a standard primary battery. For example, the output voltage 26 may be reduced to about 1.5 V if the battery cell assembly 10 may be provided in order to replace or to be used instead of a standard alkaline battery, for example of size D, C, AA, or AAA. In another example, the case 14 of the battery cell assembly 10 may have a DD or CC size and the output voltage 26 may be reduced to about 3.0 V if the battery cell assembly 10 may be used to replace two standard alkaline batteries, for example of size D or C, respectively. A DD size battery assembly 10 including a high energy density battery cell 11 and having a regulated output voltage 26 of about 3.0 V may be used to provided in order to replace or to be used instead of two standard alkaline batteries size D to power a flashlight. Compared to using two standard alkaline batteries size D, the operation time of the flashlight may not only be prolonged but also a consistently constant voltage output throughout the lifespan of the primary cell 11 may ensure a light beam of constant intensity.

Referring still to FIG. 2, the voltage regulator circuit 27 is shown configured for use with regulator 21, which may be regulator LP2980-ADJ produced by National Semiconductor, Inc. In particular, regulator 21 (LP2980-ADJ) may require input capacitor 22 (Cin) with a minimum capacitance at or above 1 μF (micro Farad) and output capacitor 23 (Cout) with a minimum capacitance at or above 2.2 μF for proper function of regulator 21. The feed forward capacitor 28 (Cf) may provide the lead compensation necessary for loop stability in regulator 21.

The output voltage 26 of the regulator 21 may be determined by the values of resistors 24 and 25. The resistors 24 and 25 may function as a voltage divider to adjust the output voltage 26 of the regulator 21. Using two resistors 24 and 25 may enable more precise control over the resistance level than using only one resistor and, therefore, more precise control over the output voltage may be also enabled. The resistors 24 and 25 may be chosen such that the output voltage of the regulator 21 may be adjusted to any desired voltage below the output voltage of the battery cell 11. Such output voltages 26 may be, for example, 1.5 V, 3.0 V, or 2.0 V. Depending on the chosen resistors 24 and 25, the output voltage 26 of the battery cell assembly 10 may be factory adjusted. Since the printed circuit board 12 is integrated within the case 14 of the battery cell assembly 10, it may be made available for a consumer the same way standard primary batteries, such as standard alkaline batteries, are currently available. Since the case 14 may have the same size and shape as standard primary batteries, such as D, C, AA, or AAA, or may have the shape of two D size or C size standard primary batteries, such as DD or CC, respectively, high energy density battery cell assemblies 10 as in embodiments of the present invention may be used in existing equipment typically powered by standard primary batteries without the need to redesign the existing equipment.

The regulator 21 is shown in FIG. 2 directly wired to the battery cell 11, however, in another embodiment it may be possible to include a small plastic tab between the regulator 21 and the battery cell 11 that may be pulled out to activate the regulator 21. In this example the on/off capability of the regulator 21 may be utilized and the shelf life of the battery cell assembly 10 may be prolonged.

Figure 3:
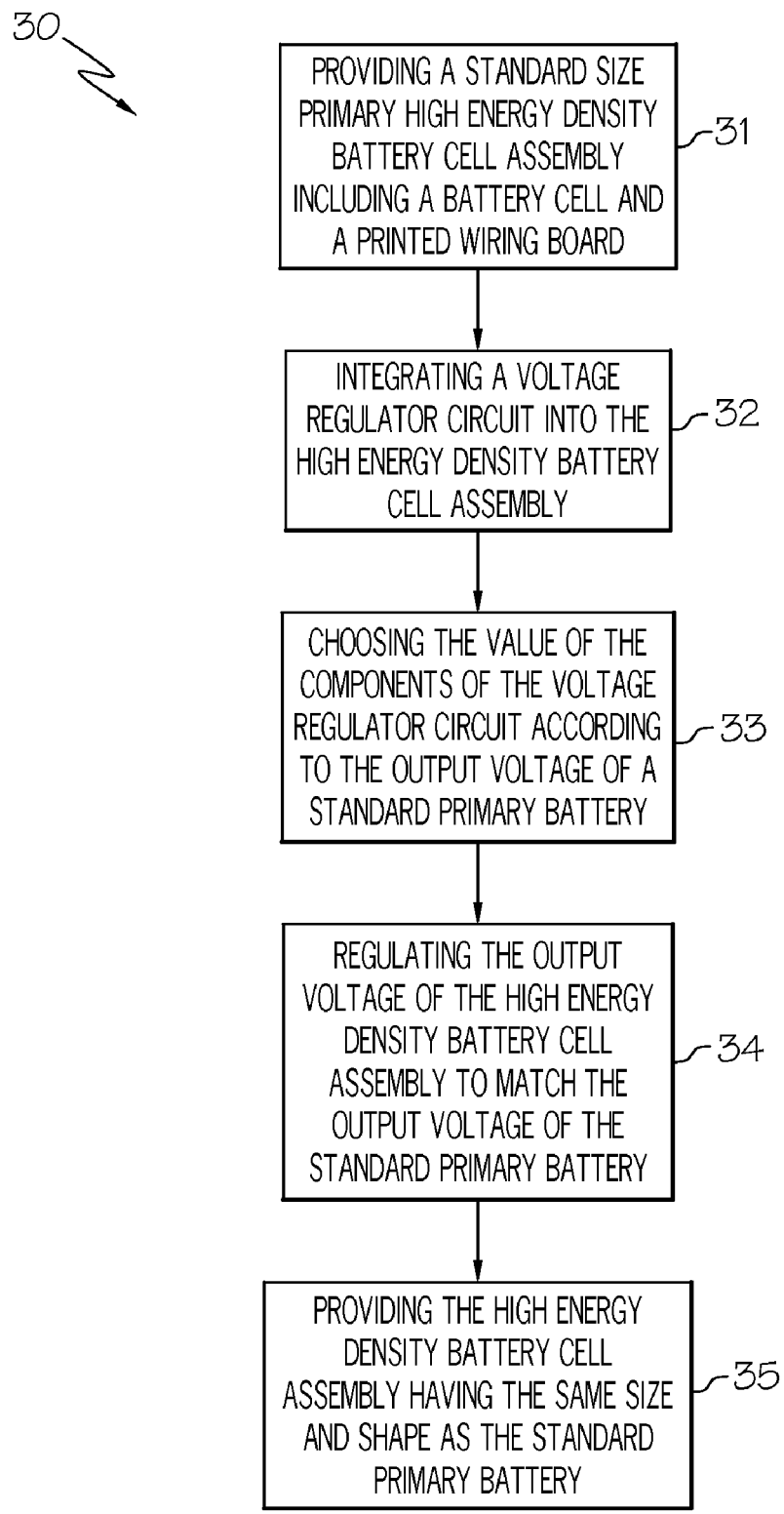
FIG. 3 is a flow chart representing a method for providing a standard size primary high energy density battery cell assembly according to an embodiment of the present invention.

Referring now to FIG. 3, a flowchart representing a method 30 for providing a standard size primary high energy density battery cell assembly 10 is shown. The method 30 may involve a step 31 where a standard size primary high energy density battery cell assembly 10 that may include a battery cell 11 and a printed wiring board 12 is provided. The high energy density battery cell assembly 10 may be provided in order to replace or to be used instead of a standard primary battery. The high energy density battery cell assembly 10 may have a higher output voltage than a typical standard primary battery. A step 32 may involve integrating a voltage regulator circuit 28 into the standard size primary high energy density battery assembly 10 by mounting a voltage regulator circuit 28 on the printed wiring board 12. The voltage regulator circuit 28 may include components, such as a voltage regulator 21, for example, regulator LP2980-ADJ produced by National Semiconductor, Inc., an input capacitor 22, an output capacitor 23, a feed-forward capacitor 28, a resistor 24, and a resistor 25. In a step 33, the values of the components of the voltage regulator circuit 28, such as resistors 24 and 25, may be chosen according to a desired output voltage 26, which may match the output voltage of the standard primary battery. A step 34 may involve regulating the output voltage of the high energy density battery cell assembly 10 to match the output voltage of a standard primary battery. The high energy density battery cell assembly 10 may be provided having the same size and shape as a standard primary battery, such as DD, D, CC, C, AA, or AAA, in a step 35.

It should be understood, of course, that the foregoing relates to exemplary embodiments of the invention and that modifications may be made without departing from the spirit and scope of the invention as set forth in the following claims.

We claim:

1. A battery cell assembly, comprising:
   a standard size primary high energy density battery cell assembly;
   a voltage regulator integrated within said battery cell assembly:
   wherein said voltage regulator is included in a voltage regulator circuit, and
   wherein said voltage regulator circuit includes:
   an input capacitor;
   an output capacitor;
   a feed-forward capacitor; and
   a first and second resistor arranged as a voltage divider.

2. The battery cell assembly of claim 1, wherein said battery cell assembly further includes a primary high energy density battery cell, and wherein said battery cell is contained within a hermetically sealed space.

3. The battery cell assembly of claim 1, wherein said battery cell assembly further includes a printed wiring board, and wherein said voltage regulator is mounted on said printed wiring board.

4. The battery cell assembly of claim 1, wherein said battery cell assembly further includes a primary high energy density battery cell, a terminal cap, and a current collector tab, and wherein said current collector tab electronically connects said battery cell with said terminal cap via said voltage regulator.

5. The battery cell assembly of claim 1, wherein said battery cell assembly further includes a lithium sulfuryl chloride DD cell having an output voltage of about 3.9 V.

6. The battery cell assembly of claim 1, wherein said voltage regulator regulates an output voltage of said battery cell assembly to an output voltage of a standard primary battery.

7. The battery cell assembly of claim 1, wherein said voltage regulator has a low dropout voltage and a low quiescent current.

8. The battery cell assembly of claim 1, wherein said battery cell assembly has a standard size D, C, AA, or AAA, and wherein said voltage regulator regulates an output voltage of said battery cell assembly to about 1.5 V.

9. The battery cell assembly of claim 1, wherein said battery cell assembly has a standard size DD or GO, and wherein said voltage regulator regulates an output voltage of said battery cell assembly to about 3.0 V.

10. A battery cell assembly useful in applications requiring uni-directional current of limited magnitude, comprising:
    a primary lithium cell;
    a voltage regulator circuit in electrical connection with said lithium cell;
    a case having the size and shape of a standard primary battery, wherein said case accommodates said lithium cell and said voltage regulator circuit;
    wherein said voltage regulator circuit is mounted on a circuit board integrated within said case;
    wherein said voltage regulator circuit regulates an output voltage of said lithium cell to an output voltage of said standard primary battery;
    wherein said voltage regulator circuit includes;
    an input capacitor;
    an output capacitor;
    a feed-forward capacitor; and
    a first and second resistor arranged as a voltage divider;
    wherein said voltage regulator circuit limits current magnitude;
    wherein said voltage regulator provides uni-directional current; and
    wherein the battery cell assembly does not include fuses or diodes mounted on the circuit board.

11. The battery cell assembly of claim 10, wherein said lithium cell is a spiral wound lithium sulfuryl chloride cell having an output voltage of about 3.9 V.

12. The battery cell assembly of claim 10, wherein said standard primary battery is a standard size D, C, AA, or AAA alkaline or carbon-zinc battery having an output voltage of about 1.5 V.

13. The battery cell assembly of claim 10, wherein said case includes a lid and a hermetical seal, and wherein said lid and said hermetical seal form a hermetically sealed space within said case for receiving said battery cell.

14. The battery cell assembly of claim 10, wherein said voltage regulator circuit is mounted on the circuit board integrated within said case, and wherein said voltage regulator circuit includes a voltage regulator having a low dropout voltage and a low quiescent current.

15. A method for providing energy from a standard size primary high energy density battery cell assembly, comprising the steps of:
    integrating a voltage regulator circuit into said high energy density battery assembly;
    regulating an output voltage of said high energy density battery cell assembly to match an output voltage of a standard primary battery;
    maintaining an electrical insulator between the battery cell and the voltage regulator circuit prior to use of the battery cell assembly; and
    removing the electrical insulator to activate the voltage regulator circuit when use of the battery cell assembly is contemplated, whereby shelf life of the battery cell assembly is prolonged.

16. The method of claim 15, further including the step of:
    mounting said voltage regulator circuit on a printed wiring board included in said high energy density battery assembly.

17. The method of claim 15, further including the steps of:
    choosing the value of a first and a second resistor included in said voltage regulator circuit according to said output voltage of said standard primary battery; and
    adjusting the output voltage of a voltage regulator included in said voltage regulator circuit to match said output voltage of said standard primary battery.

18. The method of claim 15, further including the steps of:
    regulating an output voltage of about 3.9 V of said high energy density battery cell assembly down to about 3.0 V; and
    providing said high energy density battery having a DD standard size.

* * * * *